(12) United States Patent
Shipman

(10) Patent No.: US 7,349,343 B2
(45) Date of Patent: Mar. 25, 2008

(54) NETWORK ROUTING AND CONGESTION CONTROL

(75) Inventor: Robert A Shipman, Ipswich (GB)

(73) Assignee: British Telecommunications public limited company, London (GB)

( * ) Notice: Subject to any disclaimer, the term of this patent is extended or adjusted under 35 U.S.C. 154(b) by 815 days.

(21) Appl. No.: 10/221,318

(22) PCT Filed: Mar. 29, 2001

(86) PCT No.: PCT/GB01/01410

§ 371 (c)(1),
(2), (4) Date: Sep. 11, 2002

(87) PCT Pub. No.: WO01/76269

PCT Pub. Date: Oct. 11, 2001

(65) Prior Publication Data

US 2003/0048771 A1 Mar. 13, 2003

(30) Foreign Application Priority Data

Mar. 31, 2000 (EP) .................................. 00302773

(51) Int. Cl.
*H04L 12/06* (2006.01)
(52) U.S. Cl. ......................... 370/236; 370/410
(58) Field of Classification Search ................ 370/392, 370/236
See application file for complete search history.

(56) References Cited

U.S. PATENT DOCUMENTS

| | | | | |
|---|---|---|---|---|
| 5,412,654 A | * | 5/1995 | Perkins | 370/312 |
| 5,499,237 A | * | 3/1996 | Richetta et al. | 370/400 |
| 5,790,522 A | * | 8/1998 | Fichou et al. | 370/236 |
| 5,987,011 A | * | 11/1999 | Toh | 370/331 |
| 6,049,533 A | * | 4/2000 | Norman et al. | 370/328 |
| 7,035,202 B2 | * | 4/2006 | Callon | 370/216 |
| 7,061,910 B2 | * | 6/2006 | Beshai | 370/392 |
| 7,106,707 B1 | * | 9/2006 | Strutt | 370/329 |

FOREIGN PATENT DOCUMENTS

EP 0398614 A1 11/1990

OTHER PUBLICATIONS

Krishnan, "An Approach to Path-Splitting in Multipath Networks", Proceedings of the International Conference on Communications (ICC), US, New York, IEEE, May 23, 1993, pp. 1353-1357, XP000448363.

* cited by examiner

*Primary Examiner*—Chi Pham
*Assistant Examiner*—Thai Hoang
(74) *Attorney, Agent, or Firm*—Nixon & Vanderhye P.C.

(57) ABSTRACT

In a communications network of nodes connected by links, routing of traffic is done according to routing tables available to the nodes. The routing table for each node shows fields for destination nodes and for next hop nodes towards those destination nodes, and traffic is routed at each node according to values entered in those fields. The nodes modify the values in the fields according to messages received from neighboring nodes. This controls traffic flow in that values are raised on receipt of messages from neighboring nodes. If messages are received less frequently from a node, for instance because of congestion in the network or failure of a node, the values for that node will be relatively depressed and the network will tend to route traffic away from the node.

25 Claims, 4 Drawing Sheets

| Destination Node | Next Node |
|---|---|
| | |

Initial State. The routing table is completely empty with no knowledge of next nodes or destination nodes

| Destination Node | Next Node | |
|---|---|---|
| | 1 | 3 |
| 1 | 1.0 | - |
| 3 | - | 1.0 |

Time 1. (1,1) (3,3) received resulting in two entries in the routing table. The dashes indicate that these entries do not exist

| Destination Node | Next Node | |
|---|---|---|
| | 1 | 3 |
| 1 | 1.0 | - |
| 3 | - | 1.0 |
| 4 | - | 1.0 |
| 5 | 1.0 | - |

Time 2. (5,1) (4,3) received resulting in two new entries in the routing table. Pulses received at time 1 will also be received again, reinforcing those entries.

| Destination Node | Next Node | |
|---|---|---|
| | 1 | 3 |
| 1 | 1.0 | - |
| 3 | - | 1.0 |
| 4 | 0.3 | 0.7 |
| 5 | 0.7 | 0.3 |

Time 3. (4,1) (5,3) received resulting in two new entries in the routing table. The weightings of (4,3) and (5,1) are reduced and the new entries are given weightings. The precise values are dependent on the reinforcement parameter.

| Destination Node | Next Node | |
|---|---|---|
| | 1 | 3 |
| 1 | 0.9 | 0.1 |
| 3 | 0.1 | 0.9 |
| 4 | 0.3 | 0.7 |
| 5 | 0.7 | 0.3 |

Time 4. (3,1) (1,3) received resulting in two new entries in the routing table. The weightings of (3,3) and (1,1) are reduced and the new entries are given weightings. The precise values are dependent on the reinforcement parameter.

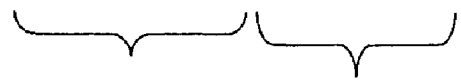

210    205

NETWORK ROUTING AND CONGESTION CONTROL

This application is the US national phase of international application PCT/GB01/01410 filed 29 Mar. 2001 which designated the U.S.

BACKGROUND

Technical Field

The present invention relates to network routing and congestion control, particularly but not exclusively for use in packet-switched communications networks.

BRIEF SUMMARY

Embodiments of the present invention employ a simple form of messaging between nodes in a network for routing and congestion control.

According to a first aspect of the present invention, there is provided routing control means for use in a communications network comprising nodes connected to each other by links, the nodes being provided with routing tables for routing traffic towards a destination node via intermediate nodes, the routing means comprising in respect of a network node:

i) routing table updating means;
ii) message receiving and processing means for receiving messages transmitted by intermediate nodes and for identifying an intermediate node by which a message has been transmitted; and
iii) means to output a message to other network nodes wherein the routing table updating means is adapted to update entries for intermediate nodes in the table in accordance with receipt of messages which identify those intermediate nodes.

A message may identify an intermediate node for instance either by content of the message or by the link on which it arrives.

Preferably, each message identifies a node at which it originated, said node being also a destination node in the network towards which traffic can be routed. Conveniently, the intermediate nodes are neighboring nodes and the network node routes traffic via those neighboring nodes for destination nodes which have been identified by the contents of the same message which is used to identify a neighboring node.

A neighboring node may also be a destination node.

A network node in an embodiment of the present invention may be enabled to build a routing table from scratch in respect of intermediate and destination nodes it receives messages from.

A network management system according to an embodiment of the present invention is intended to be able to adapt quickly to changing traffic conditions and equipment failure and to ease the task of expanding the network. It can do this by routing traffic towards nodes it gets incoming messages from and not routing traffic to nodes it gets few messages from, since these latter nodes may be suffering from congestion or failure.

Each node may transmit traffic via a queuing mechanism. If outgoing routing-related messages are sent through the same queuing mechanism, this provides a fairly direct way of controlling traffic flow in the network since the other nodes will adjust their routing tables so that they direct traffic away from nodes which are transmitting little or nothing because their queuing mechanism is heavily loaded.

A simple form of message for use in embodiments of the invention comprises an identifier for the node at which a message originated together with the time of creation of the message. This allows other nodes receiving the message to check the time of creation and operate a timeout if a message has passed a threshold age. This stops messages being continually passed on by the nodes and thus clogging up the network. It also allows nodes to treat messages differently according to their age, for instance by giving them diminishing weight in adjusting their routing table as the messages get older.

The use of the identifier plus time of creation also offers a simple, unique identifier for each message. If the nodes have means to store this unique identifier for each message received, the identifier for each new message received can be checked against the stored identifiers and the message discarded if it is found to have been previously received. This prevents messages bouncing to and fro between nodes, or looping round a circular route in the network, and incorrectly distorting the routing tables.

These messages, such as those comprising a node identifier and a time stamp, are effectively pulses in the network and this terminology is used interchangeably with "message" in some of the description below.

The time stamp might be replaced by some other distinguishing data for respective messages, such as a number or code. This will still allow receiving network nodes to recognize and discard messages which have been received previously at the same node. However, the use of a time stamp also allows messages to be discarded simply because they are past a certain age, whether or not they have been received previously by a node.

In place of a node identifier and time stamp, a message could comprise a node identifier for the node at which it originated plus a hop count for the number of nodes it has been passed on by. The hop count has an effect similar to the time stamp except that it is more closely related to the topology of the network and the node processing capacity it has used. Instead of messages being discarded on the basis of age, they will be discarded on the basis of their travel pattern in the network.

It would also be possible for nodes to add their own identifier to messages they receive and process so that a single message holds information in relation to more than one intermediate node which could potentially be used for routing. However, this has the possible disadvantage of increasing message size which increases the load on the network and the processing time at the nodes.

According to a second aspect of the present invention, there is provided a method of routing traffic between nodes in a network, which method comprises:

(i) receiving a message at a network node;
(ii) identifying by means of the received message a node at which it originated and a neighboring node from which it was received; and
(iii) making or modifying an entry in a routing table, for use in routing traffic towards said originating node via said neighboring node.

The method may further comprise routing traffic in accordance with the routing table.

BRIEF DESCRIPTION OF THE DRAWINGS

A network management system is described below as an embodiment of the present invention, by way of example only, with reference to the accompanying drawings in which:

FIG. 3 shows steps in formation of a weighted routing table of the type shown in FIG. 2;

DETAILED DESCRIPTION OF EXEMPLARY EMBODIMENTS

SYSTEM REQUIREMENTS

Bleeping Nodes, Weighted Routing and Node Availability

Figure 1:
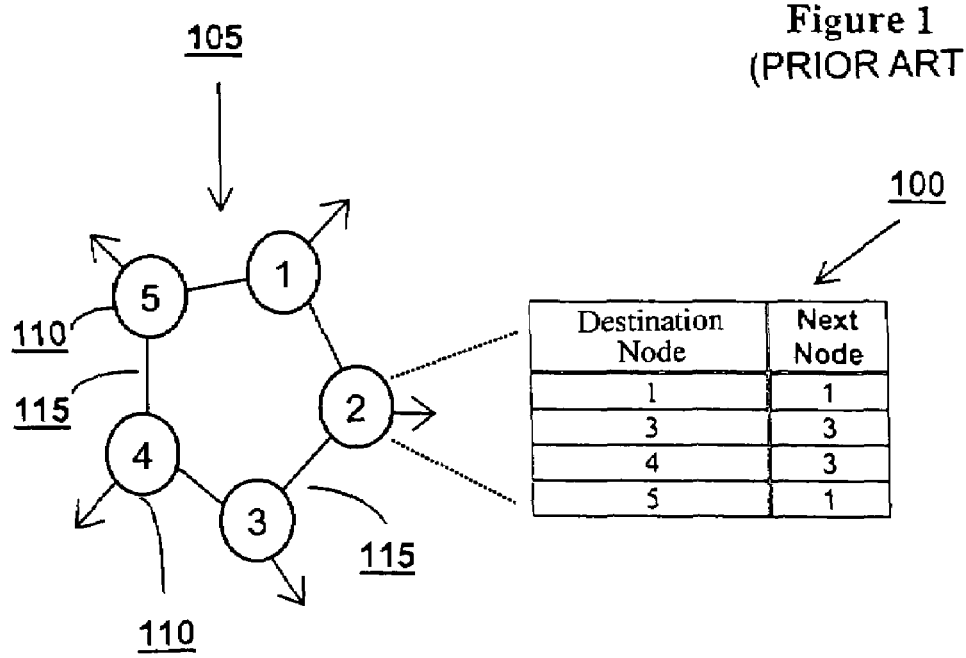
FIG. 1 shows schematically a communications network, and a routing table of known type associated with a node of the communications network.

As shown in FIG. 1, a known network 105 can be represented generally as comprising nodes 110 connected by links 115. A routing table 100 is stored at each node. The routing table 100 gives a default "next hop" for each destination node in the network, typically calculated using shortest path algorithms.

In embodiments of the present invention, the network nodes 110 broadcast "pulses", or simple messages, to all neighboring nodes. These pulses are used to generate weighted routing tables 200, as shown in FIG. 2.

The pulses are very lightweight, only containing information about the originating node 110 and the time of their creation. They are thus not likely to have a significant impact on the network bandwidth. Each possible destination node 110 in the network 105 advertises its presence by generating these pulses at a fixed frequency. The pulses propagate through the network and modify routing tables. Each pulse tends to modify the routing table so that data is encouraged towards its originating node 110 via the path the pulse has taken. The combination of pulses arriving at a node 110 thus together determine the path that data will take from that node to each other node in the network.

Figure 2:
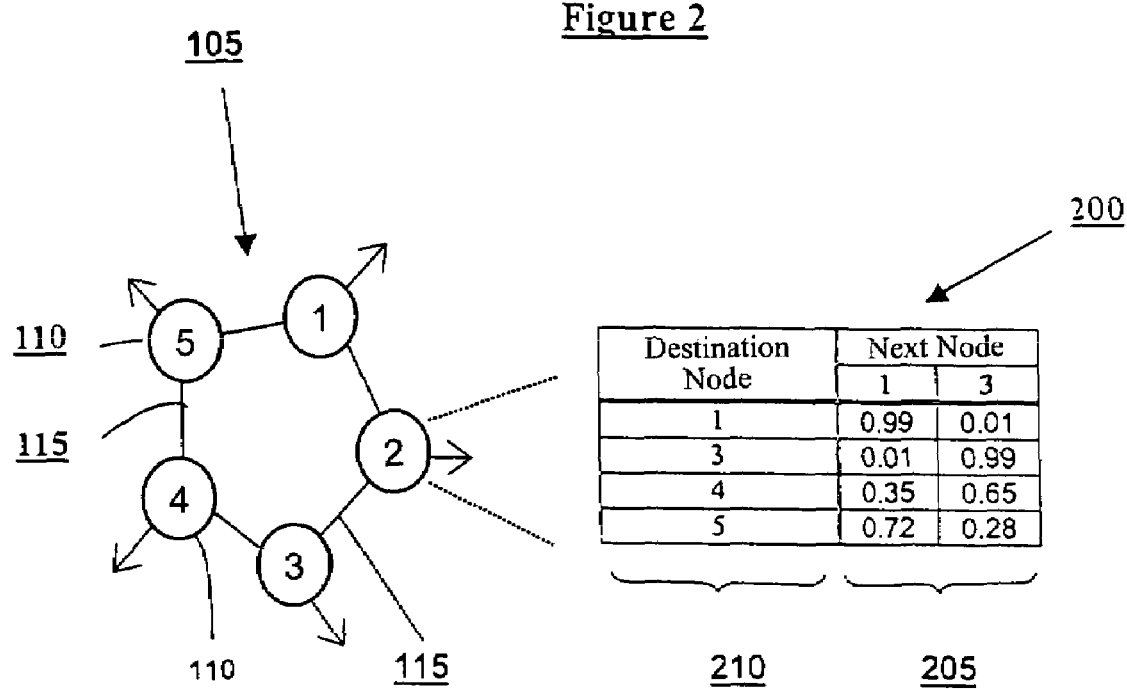
FIG. 2 shows schematically a weighted routing table according to an embodiment of the present invention associated with a node of the communications network of FIG. 1.

Looking at the routing table 200 shown in FIG. 2, it can be seen that, rather than specify a definite next hop, each of the possible next hops 205 to get to a destination node 210 will be weighted in accordance with its perceived desirability, based on pulses received.

The rate at which pulses propagate through the network will affect the influence the pulses have on routing tables. If pulses are delayed, they will have less influence on a routing table than pulses which have travelled via a less congested route, because fewer of them may be received within a given time frame and because older pulses have a lesser effect on the weights within the routing table. If there is a problem in an area of a network, the pulses may actually be lost altogether. A convenient way of subjecting pulses to appropriate delay at each node is to put the pulse through a data, or message, queue at a node. If the node is already overloaded, the pulse will be appropriately delayed, or even lost, having the effect that routing tables in other nodes will tend to be less weighted to route traffic towards the overloaded node.

In preferred embodiments of the invention, the destination nodes may use variable frequency pulses. The frequency can then be dependent on conditions at the node 110 generating the pulses, for example current data load or processing capability. Nodes may then advertise not only their presence but also their ability to perform some function. This may be important as networks become more active and are able to perform computational tasks for the user. The various nodes at which a given task can be performed would be advertised by pulsing at a frequency dependent on the node's current ability to carry out the task and nodes would be selected based on their frequency of pulsing.

Updating Routing Tables

The following describes how the routing tables 200 at the nodes 110 can be updated to weight the "next hops" for each node. The weights are adjusted in such a way as to increase the weight of the "next hop" to the node a pulse was received directly from when routing data to a destination node that is the same as the pulse's generating node. FIG. 2 shows a routing table 200 for a node 110 (Node 2) in which that next hop towards destination Node 4 is already weighted towards neighboring Node 3. This can be seen by the weighted values 0.65 and 0.35 assigned to neighboring Nodes 3 and 1 respectively, against destination Node 4. If Node 2 now receives a pulse from Node 3 that was generated by Node 4, the weighting of Node 3 as a next hop for data with destination Node 4 would be further increased in Node 2's routing table.

The weightings are always adjusted such that the total weightings for a given destination node sum to 1.

An initial formula for adjusting the weightings to be used is shown below. However, other formulae may be used, for instance that take into account previous updates and/or smooth out transients.

$$r^i_{s,m}(t+1) = \frac{r^i_{s,m}(t) + \delta r}{1 + \delta r} \quad (1)$$

$$r^i_{s,l}(t+1) = \frac{r^i_{s,l}(t)}{1 + \delta r} \quad (2)$$

$$\delta r = \frac{max - min}{age} + min \quad (3)$$

Equation (1) specifies the new reinforced weight for the relevant destination node entered against a "next hop", when a pulse is received via that "next hop" for the destination node. Equation (2) specifies the amount by which the weights for that destination node entered against all other "next hops" are reduced. Equation (3) specifies an example reinforcement parameter that is used in Equations (1) and (2).

In the equations, i is the number of the current node 110 at which a pulse has been received s is the number of the source node of the pulse, m is the number of the node the pulse was received from δr is a reinforcement parameter that is specifiable and t and (t+1) indicate (discrete) time The reinforcement parameter δr modifies the amount the weights are adjusted in Equations 1 and 2. It runs from a maximum value (max) to a minimum value (min). The precise value is determined by the age of the pulse such that young pulses with the minimum age of 1 result in a maximum value for the reinforcement value and old pulses produce a reinforcement value that tends towards the minimum value.

Alternative reinforcement parameters are possible to modify the effect that pulses have on the routing tables. For example, an alternative to equation (3) may be devised in which the number of pulses already received from a node is taken into account. The reinforcement may be stronger for the first pulses received from a node so that, for example, weightings can be quickly adjusted when new destinations advertise themselves.

Self-Configuration of Routing Tables

Referring to FIG. 3, one of the requirements of the system is for it to be self-configuring. In order to achieve this, the routing tables are not pre-specified with entries for existing nodes 110 but will be formed entirely through the pulse activity. Routing entries for a given destination node and "next hop" nodes will only be formed when pulses are received that indicate such pairings to be possible. This "on-line" generation of routing information is shown in FIG. 3 for the example of a network shown in FIG. 2. It demonstrates the formation of a routing table 200 for node 2.

Referring to FIG. 3, in the initial state, the routing table 200 is completely empty with no knowledge of next nodes or destination nodes.

At time 1, pulses are first received at node 2 which were actually generated by the neighboring nodes to node 2. Hence the two nodes which are immediate neighbors of node 2 appear as both destination nodes and next nodes in the routing table for node 2. That is, as far as node 2 is concerned, a pulse has been received from destination node 1 "via" next node 1 and a pulse has been received from destination node 3 "via" next node 3. This means that weightings will be entered for next nodes 1 and 3 against the destination nodes 1 and 3 and the routing table 200 for node 2 now has knowledge of nodes 1 and 3 both as next nodes and as destination nodes in the network. (Dashes in the routing table 200 indicate that no pulses have been received for the relevant next nodes against the destination nodes indicated.)

At time 2, pulses have now been received at node 2 from destination nodes 4 and 5 via next nodes 3 and 1. Weights are therefore entered appropriately. All weightings at this stage show the value 1. It should be noted that additional pulses may again have been received from destination nodes 1 and 3 via next nodes 1 and 3 but since the weightings cannot go above 1, these additional pulses have no effect.

At time 3, pulses have been received from destination nodes 4 and 5, but this time via next nodes 1 and 3 respectively. Thus the previous weightings against nodes 3 and 1 respectively will be reduced and new entries made against nodes 1 and 3. The precise values for the adjusted weightings are dependent on the reinforcement parameter mentioned above.

At time 4, additional pulses have been received from destination nodes 1 and 3, this time via next nodes 3 and 1 respectively. This results in reduced weightings for next nodes 1 and 3 against destination nodes 1 and 3, and newly introduced weightings for next nodes 3 and 1 against destination nodes 1 and 3. Again, the actual values of the adjusted weightings are dependent on the reinforcement parameter. In this example, it can be seen that the adjustment made at time 4 is less than the adjustment made at time 3. In this case, there is a time dependent factor in the reinforcement parameter which means that pulses coming via a longer or more congested route, have less reinforcing effect on the weightings than pulses which have taken a shorter or less congested route.

Pulse Handling and Adaptation to Changing Traffic Patterns

Figure 4:
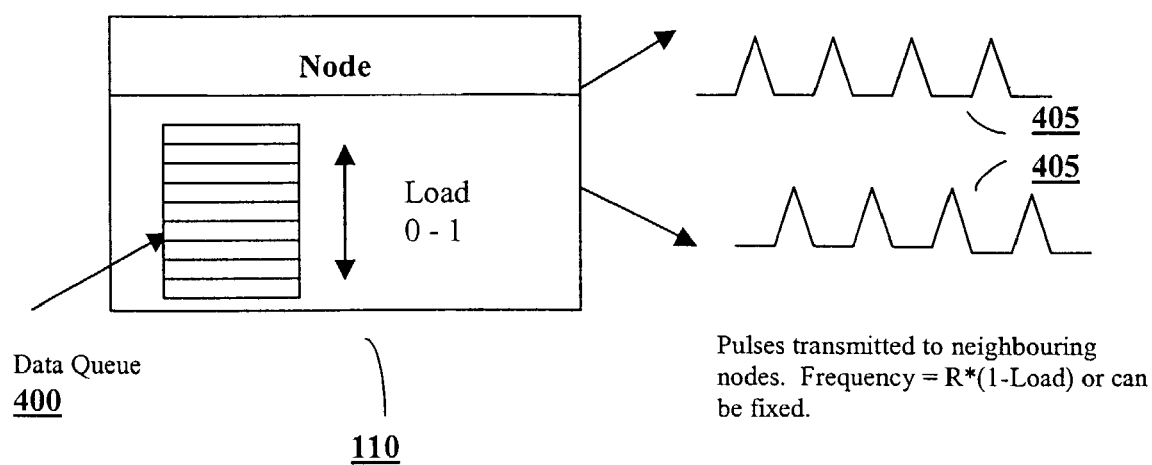
FIG. 4 shows pulse transmission by a node of the communications network of FIG. 1.

Referring to FIG. 4, when a pulse arrives at a node 110, the following procedure is followed:

1. Pulses are immediately used to update the routing table as outlined above.
2. Each node 110 maintains a data queue 400 which holds data which needs to be either forwarded or processed by the node 110. Pulses which have been used to update the routing table 200 are then added to the same queue as the data. Their propagation is thus delayed by a period dependent on the load at that node 110.
3. On reaching the front of the data queue 400, the pulses 405 are broadcast to all neighboring nodes with the exception of the node the pulse was received from.

The example demonstrated above with reference to FIG. 3 did not consider delays at network nodes. However, in reality the arrival time of the pulses would be heavily dependent on the amount of congestion in the network. Pulses would arrive much less frequently via routes that were more congested and would thus increase the relevant weightings less than pulses arriving from less congested routes. The system is thus able to adapt to changing traffic conditions. If a previously good route became congested, pulses from other routes would update the routing table more frequently and encourage traffic away from the congestion. This adaptation would be occurring continuously, tracking the current conditions. It will be important to ensure, through suitable parameter selection, that the system does not track the traffic too closely, moving with every transient. There will be a playoff between adaptation and stability that will need to be considered.

The way in which the parameters are calculated can of course be tailored to the behavior required in a particular network. In present embodiments a maximum value of 0.2 and minimum value of 0 have been used with success for the reinforcement parameter.

Adapting to Node Failure

A requirement of the system is for it to be able to quickly adapt to failures in the network. When a node 110 or link 115 fails, pulses 405 will no longer be generated or propagated in that part of the network. Thus, no weighting reinforcements will occur for routes involving the failed equipment. Pulses from elsewhere in the network would still be arriving however and, in the absence of the "competing" pulses would quickly modify the weightings to encourage data away from the failures. The speed at which these changes occur depends on the reinforcement parameter and the network congestion. Other mechanisms may also be used. For example if no pulses are received from a node in a given threshold period, the associated weighting may be automatically zeroed and re-distributed amongst the other possibilities. Taking the situation at "Time 4" shown in FIG. 3, if no pulses were received from Node 3 in a given number of time steps, all weightings would be assigned to Node 1 making this the default node 110 for all traffic. When Node 3 was repaired and started again to transmit pulses 405, the routing table 200 would be modified as normal to reflect the changing situation.

Growing the Network

The system will need to accommodate new nodes 110 placed in the network 105. This is supported by the self-configuration of routing tables 200 as described above. The only requirement is for the new node to be assigned a unique identification (ID). If the node is a destination node, it can begin transmitting pulses to advertise its presence. These pulses would modify the routing tables 200 of other nodes 110 in exactly the same way as previously described. Pulses arriving from elsewhere in the network 105 would also be used to generate a routing table 200 for the new node 110.

Pulse Termination and Circular Routes

The generated pulses 405 must be terminated at appropriate times to avoid swamping the network with pulses that are no longer required and maybe endlessly travelling around the network in circular routes. All pulses hold a timestamp indicating when they were created. After being used to update the routing table at a given node, as described with reference to FIG. 3, the pulses 405 are only placed into the data queue for onward transmission if a pulse with the same source node and timestamp has not already been handled by that node. Thus, pulses that arrive at a given node via a longer or more congested path are terminated as a pulse arriving by a shorter or less congested path has already been handled and advertised to other neighboring nodes. This procedure eliminates the possibility of circular routes and reduces the number of pulses travelling around the network at any one time.

Traffic Routing

Once the pulses 405 have generated routing tables as described with reference to FIG. 3, data can be routed around the network. When a data packet is received at a node 110 with a given destination node, the routing table in the node can be consulted to determine which next node should be chosen for that packet. This decision can be made by choosing the next node with the highest weighting from the routing table. Alternatively, the decision could be made probabilistically. For example, if there were two possible next nodes for a given destination node each with a weighting of 0.5, half the data packets for that destination node could be sent to one next node and half to the other. In this scenario the data packets would need to hold information about nodes they have already been routed via so that the node can ensure that data is not routed back to a node it has already visited. This would ensure that data is not endlessly routed around the network without reaching its destination.

SYSTEM DESIGN

A system according to an embodiment of the present invention can be developed using network simulation tools. The three main components of a "pulsing nodes" system are described below.

Pulses

The pulses generated by the nodes 110 are very simple and contain little information. The required information is encoded implicitly in the frequency of pulse arrival rather than encoded explicitly within a pulse. However, the pulses do need to store information regarding the originating node 110 and the time of their creation, which allows the age of the pulse to be calculated.

Figure 5:
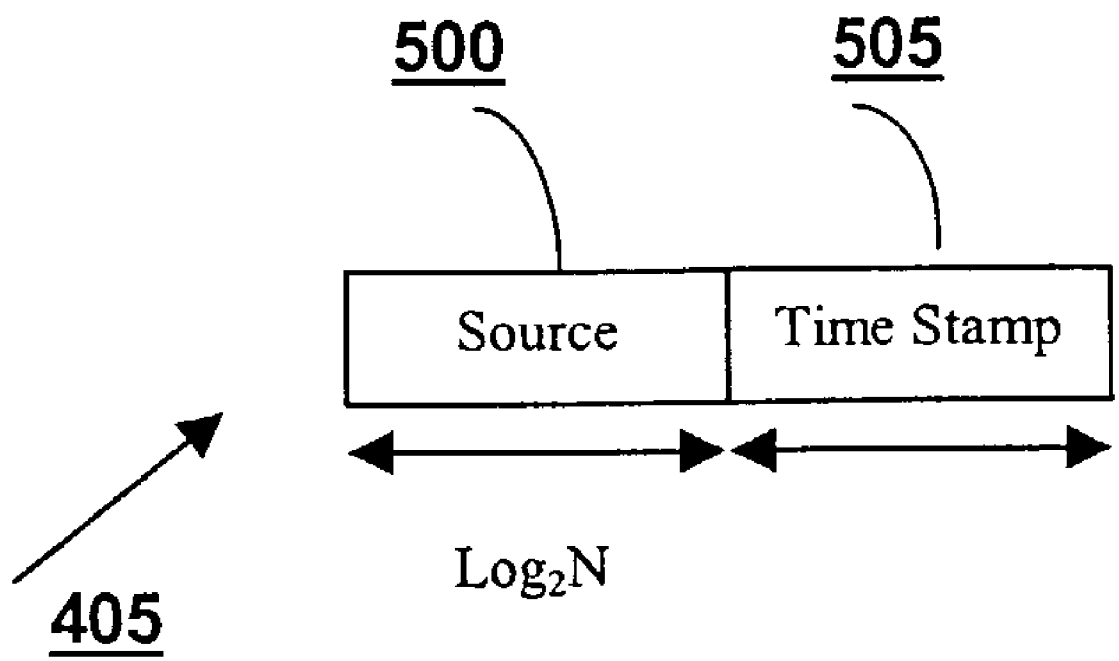
FIG. 5 shows pulse content for a pulse transmitted by a node of the communications network of FIG. 1.

Referring to FIG. 5, the initial pulse architecture comprises two sections: "Source" and "Time Stamp".

The first section will need to be dimensioned according to the maximum number "N" of nodes 110 expected in a network 105. For a software simulation, the pulse 405 can be represented by an object in an object oriented system, which will provide methods for setting the source node variable and timestamp.

Routing Tables

In order to implement the self-configuring routing tables 200 required for the bleeping nodes system, a routing table class is required. An instance of this object will be contained in each node 110 in the network 105 and its job will be to hold the current routing information for that node. The algorithms for ascertaining how the tables are formed and how the weights are modified will be external to this class. It simply needs to provide a storage mechanism and methods to allow information to be added and modified.

The table needs to be two-dimensional and fully extensible. It will be implemented using a two-dimensional hashtable. The hashtable allows values to be associated with a key and efficient look-ups to be performed using that key. When pulses arrive from a new destination node a new entry will be created in the hashtable with the destination node ID as a key. The value associated with this key will be another hashtable with keys for each of the possible next nodes. The value associated with each of these keys will be the weighting.

Information on hashtables and the like is available in the second edition of "Java in a Nutshell" by D Flanagan, for instance at page 545.

Network Nodes

The object implementing a major part of the system requirements will be the Node class. This class is responsible for maintaining a routing table 200, a data queue 400 and for handling and generating pulses 405. This class is preferably updatable. During its update there are three main procedures that need to be performed, these being as follows.

1. Pulse Transmission. If the node 110 is a possible destination node, it will need to determine whether a pulse needs to be generated and broadcast to neighboring nodes. Initially, this will be at a fixed frequency so the node simply needs to keep a count, for instance of the number of update cycles it's been through, and generate a new pulse when the count reaches a given value. The node sets the pulse's "Source" Section 500 to be its own ID, and sets the "Time Stamp" Section 505 and transmits the pulse 405 to all neighboring nodes. The update count is then cleared.

2. Handle Incoming Pulses. Before routing any data the node 110 must handle any incoming pulses as these are of a higher priority. For each pulse 405 that has arrived, the nodes routing table 200 is updated as described with reference to FIG. 3. It then determines whether it has already handled a pulse with the same "Source" 500 and "Time Stamp" 505. If so, the pulse is discarded. Otherwise it is added to the same queue 400 as is used for the data.

3. Route the Data. The node 110 then needs to deal with the data in its data queue 400. It retrieves a number of entries from the queue; this number is a parameter that is dependent on the node's processing capability. The quicker the node, the more it can handle in one update cycle. It then checks whether the entries are pulses or packets of data. In the former case, the pulse 405 is broadcast to all nodes other than the one it was received from. In the latter case, the routing table 200 is consulted and the packet is sent to the "next hop" node 110, usually with the highest weighting.

In the above, the primary purpose of the pulses is to modify routing tables at network nodes so that traffic carried by the network will tend to be routed away from congested areas or nodes. Nodes output pulses at regular intervals and they are transmitted immediately without the possibility of delay in the generating node's data queue. On subsequent hops pulses are added to the node's data queue and may therefore be delayed.

This procedure is appropriate for a typical scenario in which destination nodes must be advertised regardless of congestion as, for example, there may be only a single access point to other networks. In other scenarios, however, that may not be the case. It may be that there are several access points to alternative networks or that the network is providing a service that can be carried out at numerous nodes.

In this case it may be appropriate to vary the frequency of pulsing at the source to account for the ability of the node to carry traffic or provide the service. The frequency of the pulses can be made dependent on the current congestion at the node or the computational load it is currently experiencing. Thus, nodes that are congested or busy would generate fewer pulses and hence encourage less traffic towards them. Conversely, nodes that were less congested or busy would produce pulses at a higher frequency and encourage more traffic towards them. Pulses may also be placed into the data queues of the generating nodes such that they are delayed at source by congestion.

What is claimed is:

1. Routing control apparatus for use in a communications network comprising nodes connected to each other directly and indirectly by links, the nodes being provided with routing tables for routing traffic towards respectively corresponding destination nodes via intermediate nodes, the routing control apparatus comprising in respect of a network node:
   (i) a routing table for use in routing traffic transmitted by the node;
   (ii) routing table updating means;
   (iii) routing message receiving and processing means for receiving routing-related messages transmitted by other nodes that may be destination nodes for future traffic and for identifying one or more intermediate nodes by which the routing messages have been transmitted; and
   (iv) routing means to output traffic to one or more other network nodes,
   wherein the routing table updating means is adapted to update entries for intermediate nodes in the table in accordance with receipt of routing messages from the destination nodes.

2. Apparatus according to claim 1 wherein an intermediate node comprises a neighboring node.

3. Apparatus according to claim 1 wherein a received routing message identifies a node at which the message originated, and the routing table updating means is further adapted to update entries for originating nodes in the table in association with an intermediate node identified for the received routing message.

4. Apparatus according to claim 1 wherein content of a received message identifies an intermediate node by which it has been transmitted.

5. Apparatus according to claim 1 wherein the path a received message has taken identifies an intermediate node by which it has been transmitted.

6. Apparatus according to claim 1 wherein the routing table updating means comprises means to weight existing entries in the routing table.

7. Apparatus according to claim 1, wherein the network node is provided with a queuing mechanism for queuing traffic to be transmitted by the node, the means to output a message being arranged to output the message to the queuing mechanism such that a message is output with a delay related to transmission delays at the network node.

8. Apparatus according to claim 6 wherein the routing table updating means is adapted to change the weight of an entry for a neighboring node on receipt of a message transmitted by that neighboring node, and traffic is routed by the network node towards a destination node by selecting a neighboring node according to the weight assigned to entries in the routing table for that neighboring node.

9. Apparatus according to claim 1 wherein the routing means in respect of the network node comprises means to build a routing table from data associated with received messages.

10. Apparatus according to claim 9 wherein a routing table built by the routing means comprises entries made in respect of
   i) each destination node identified from the content of a received routing message, and
   ii) each neighboring node identified by the path taken by the received routing message associated with a destination node identified from the content of said received routing message.

11. Apparatus according to claim 9 wherein a routing table built by the routing means comprises entries made in respect of each destination node identified form the content of a received routing message, in association with a neighboring node identified from the content of said received routing message.

12. Apparatus according to claim 1 wherein received routing messages comprise time data, indicating time of their creation, and the routing message receiving and processing means is adapted to discard routing messages where the time data indicates at least a threshold period of time has passed since a message was created.

13. Apparatus according to claim 1 wherein received routing messages comprise time data, indicating time of their creation, the apparatus further comprising means for storing time data and the identity of an originating node for each routing message received, and the routing message receiving and processing means is adapted to discard routing messages where the time data and identity of the originating node match data already stored for a previously received routing message.

14. Apparatus according to claim 1 wherein received routing messages comprise hop count data, indicating the number of nodes having already transmitted the message, and the routing message receiving and processing means is adapted to discard routing messages where the hop count data indicates at least a threshold number of nodes have already transmitted the message.

15. Apparatus according to claim 1, which further comprises means for generating messages and outputting them from a node of the network provided with processing capacity, the messages being output at a rate determined by the quantity of processing capacity available at the node, each message containing an identifier for the node, such that traffic for processing can be routed by other nodes of the network towards a node with processing capacity to an extent determined by its available processing capacity.

16. A method of routing traffic between nods in a network, which method comprises:

a. receiving a routing-related message at a network node;
b. identifying by means of the received routing-related message a node at which it originated and a neighboring node from which it was received; and
c. making or modifying an entry in a routing table, for use in routing traffic towards said originating node via said neighboring node.

17. A method according to claim 16, further comprising routing traffic in accordance with the routing table.

18. A method according to claim 16 which further comprises weighting entries in the routing table and routing traffic in accordance with relative weighting between neighboring nodes associated with the same originating node.

19. A method according to claim 16 which further comprises transmitting messages from the network node at a rate determined by the available capacity of the node.

20. A method according to claim 19 which further comprises:
   queuing routing-related messages for processing at the node, together with traffic for transmission by the node, such that the volume of traffic at the node determines the rate at which routing-related messages are transmitted from the node.

21. A method according to claim 16 wherein the neighboring node by which a message is received is identifiable by the path by which the message was received a the network node.

22. A method according to claim 16 wherein the neighboring node by which a message is received is identifiable by content of the message received at the network node.

23. A method according to claim 16 wherein a received routing-related message comprises a time stamp indicating the time of its creation and the method further comprises processing the time stamp and discarding the message in the event that its time stamp indicates a threshold period of time has elapsed since said time of creation.

24. A method according to claim 16 wherein a received routing-related message comprises an identifier for the message and the method further comprises storing identifiers for received messages, comparing the identifiers for received messages with the stored identifiers and discarding messages for which the identifier matches a stored identifier.

25. A method according to claim 24 wherein a routing-related message identifier comprises a time stamp indicating its time of creation and an identifier for the node from which it originated.

\* \* \* \* \*